United States Patent
Agrawal et al.

(10) Patent No.: US 8,898,269 B2
(45) Date of Patent: Nov. 25, 2014

(54) RECONCILING NETWORK MANAGEMENT DATA

(75) Inventors: Dakshi Agrawal, Monsey, NY (US);
Matthew Duggan, Surrey (GB);
Vasileios Pappas, Elmsford, NY (US);
Mudhakar Srivatsa, White Plains, NY (US); Kristian Jon Stewart, Surrey (GB); Murtaza Zafer, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 862 days.

(21) Appl. No.: 13/047,267

(22) Filed: Mar. 14, 2011

(65) Prior Publication Data

US 2012/0239797 A1 Sep. 20, 2012

(51) Int. Cl.
*G06F 15/173* (2006.01)
*H04L 12/24* (2006.01)

(52) U.S. Cl.
CPC .............. *H04L 41/12* (2013.01); *H04L 41/145* (2013.01)
USPC ......................................... 709/223; 709/220

(58) Field of Classification Search
CPC .................................. G06F 15/16; G06F 17/30
USPC ....................................................... 709/224
See application file for complete search history.

(56) References Cited

U.S. PATENT DOCUMENTS

| | | | |
|---|---|---|---|
| 6,988,109 B2 | 1/2006 | Stanley et al. | |
| 2004/0162802 A1* | 8/2004 | Jonas | 707/1 |
| 2004/0250028 A1* | 12/2004 | Daniels et al. | 711/156 |
| 2007/0011014 A1 | 1/2007 | Umapathy | |
| 2007/0118551 A1 | 5/2007 | Akkiraju et al. | |
| 2007/0209075 A1* | 9/2007 | Coffman | 726/23 |
| 2008/0049022 A1* | 2/2008 | Sherb et al. | 345/440 |
| 2008/0104222 A1 | 5/2008 | Brans et al. | |
| 2009/0083231 A1* | 3/2009 | Eberholst et al. | 707/3 |
| 2010/0049676 A1* | 2/2010 | Devitt et al. | 706/12 |

OTHER PUBLICATIONS

Sivathanu, G., et al., "Ensuring Data Integrity in Storage: Techniques and Applications," StorageSS'05, Nov. 11, 2005, Fairfax, Virginia, Copyright 2005, ACM 1-59593-223-X/05/0011.
Pierce, E.M., "Assessing Data Quality with Control Matrices," Communications of the ACM, vol. 47, No. 2, Feb. 2004.

* cited by examiner

*Primary Examiner* — David Lazaro
*Assistant Examiner* — Zia Khurshid
(74) *Attorney, Agent, or Firm* — Thomas Grzesik; Fleit Gibbons Gutman Bongini & Bianco PL

(57) ABSTRACT

Network management data is managed by determining that a first version and a second version of a set of network management data have been created. The set of network management data is associated with a plurality of managed entities in a network. First and second network graphs are created based on the first version and second version of the set of network management data, respectively. The first and second network graphs include a first and second set of entities in the plurality of managed entities, respectively. A similarity metric is assigned between at least one or more entities in the first and second set of entities. At least a first entity in the first set of entities and at least a second entity in the second set of entities are determined to be identical entities based on the similarity metric being one of equal to and above a first given threshold.

21 Claims, 7 Drawing Sheets

RECONCILING NETWORK MANAGEMENT DATA

This invention was made with Government support under Contract No.: W911NF-06-3-0001 awarded by U.S. Army. The Government has certain rights in this invention.

BACKGROUND

The present invention generally relates to computing networks, and more particularly relates to network management data.

A key problem in systems management is reconciliation of data gathered for the maintenance and management of large information technology (IT) systems. Typically, the data gathered by systems management tools for a particular entity (software or hardware entity) is associated with an identifier that uniquely identifies the corresponding entity. This identifier is usually generated automatically by using heuristic rules. For example, the Internet Protocol address assigned to a server or the DNS name of a server can be used as an identifier. This practice works well as long as the IT system is relatively stable so that these automatically generated identifiers remain consistent over a large time period.

However, when the subsystems or entities migrate (e.g., changing versions of a software, changing physical location of a software component, changing hardware, running an application stack in a virtual environment, etc.), heuristic rules (e.g., resource types and naming properties in CMDBf Specification developed by a six-company consortium BMC, CA, Fujitsu, HP, IBM, and Microsoft) usually produce different identifiers for the same logical entity before and after migration. This creates a problem of information reconciliation since without any reconciliation, to the system management software it seems that certain entities have disappeared and others have appeared when in fact only the identifiers have changed.

BRIEF SUMMARY

In one embodiment, a method for managing network management data is disclosed. The method comprises determining that a first version and a second version of a set of network management data have been created. The set of network management data is associated with a plurality of managed entities in a network. A first network graph is created, in response to the determination, based on the first version of the set of network management data. The first network graph includes a first set of entities in the plurality of entities. A second network graph is also created, in response to the determination, based on the second version of the set of network management data. The second network graph includes a second set of entities in the plurality of entities. A similarity metric is assigned between at least one or more entities in the first set of entities and one or more entities in the second set of entities. At least a first entity in the first set of entities and at least a second entity in the second set of entities are determined to be identical entities in response to the similarity metric assigned between the at least first entity and the at least second entity being one of equal to and above a first given threshold.

In another embodiment, a system for managing network management data is disclosed. The system comprises a memory and a processor that is communicatively coupled to the memory. A network manager is communicatively coupled to the memory and the processor. The network manager is configured for performing a method. The method comprises determining that a first version and a second version of a set of network management data have been created. The set of network management data is associated with a plurality of managed entities in a network. A first network graph is created, in response to the determination, based on the first version of the set of network management data. The first network graph includes a first set of entities in the plurality of entities. A second network graph is also created, in response to the determination, based on the second version of the set of network management data. The second network graph includes a second set of entities in the plurality of entities. A similarity metric is assigned between at least one or more entities in the first set of entities and one or more entities in the second set of entities. At least a first entity in the first set of entities and at least a second entity in the second set of entities are determined to be identical entities in response to the similarity metric assigned between the at least first entity and the at least second entity being one of equal to and above a first given threshold.

In yet another embodiment, a computer program product for managing network management is disclosed. The computer program product comprises a storage medium readable by a processing circuit and storing instructions for execution by the processing circuit for performing a method. The method comprises determining that a first version and a second version of a set of network management data have been created. The set of network management data is associated with a plurality of managed entities in a network. A first network graph is created, in response to the determination, based on the first version of the set of network management data. The first network graph includes a first set of entities in the plurality of entities. A second network graph is also created, in response to the determination, based on the second version of the set of network management data. The second network graph includes a second set of entities in the plurality of entities. A similarity metric is assigned between at least one or more entities in the first set of entities and one or more entities in the second set of entities. At least a first entity in the first set of entities and at least a second entity in the second set of entities are determined to be identical entities in response to the similarity metric assigned between the at least first entity and the at least second entity being one of equal to and above a first given threshold.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
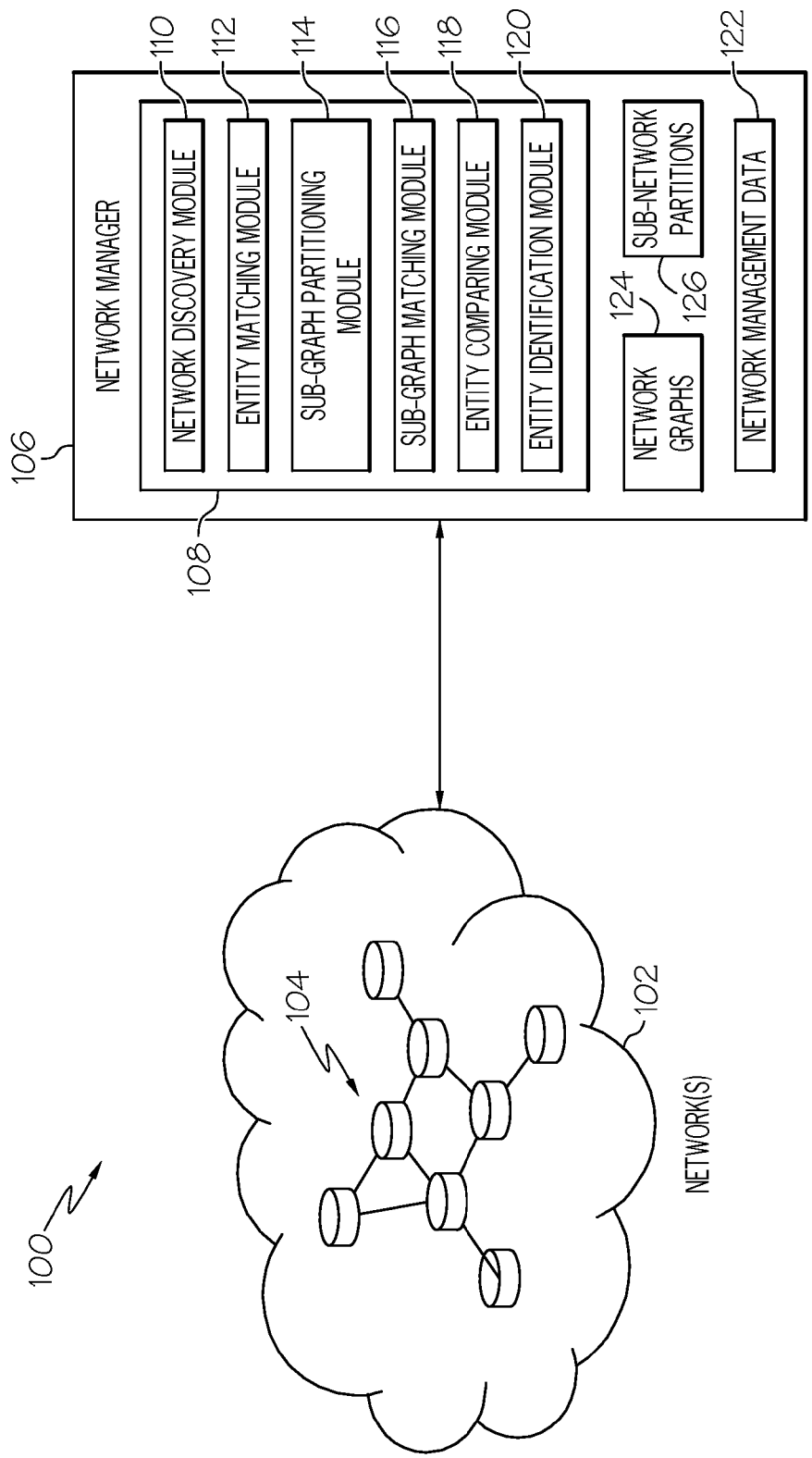
FIG. 1 is a block diagram illustrating one example of an operating environment according to one embodiment of the present invention.

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operating Environment

FIG. 1 shows one example of an operating environment 100 applicable to various embodiments of the present invention. The operating environment 100, in one embodiment, comprises one or more IT systems/networks 102. The network 102 is comprised of a plurality of network entities/nodes 104 such as, but not limited to, software components, physical servers, network devices, virtual LAN, and host data. FIG. 1 also shows one or more servers 106 communicatively coupled to the network 102.

The server 106 comprises a network manager 108 that maintains and reconciles management data associated with the IT system/network 102. The network manager 108 comprises a network discovery module 110, an entity matching module 112, a sub-graph partitioning module 114, a sub-graph matching module 116, an entity comparing module 118, and an entity identification module 120. These components of the network manager 108 are discussed in greater detail below. The server also comprises a set of system/network management data 122, network graphs 124, and sub-graph partitions 126, which are discussed in greater detail below.

In one embodiment, the network manager 108 analyzes the system/network 102 and discovers a topology of network devices (e.g., the entities/nodes 104) that make up that system/network 102. The network manager 108 maintains system/network management data 122 such as a change history of infrastructure configuration and dependencies for the system/network 102 similar to that of the IBM Tivoli Application Dependency Discovery Manager and other change management engines. As will be discussed in greater detail below, the network manager 108 further reconciles this system/network management data utilizing more accurate and robust methods as compared to conventional network management systems.

Reconciling IT System/Network Management Data

As discussed above, a key problem in systems management is reconciliation of data gathered for the maintenance and management of large IT systems. Conventional network management systems that rely on automatically generated identifiers for this data are generally unable to efficiently and accurately manage migration of subsystems or entities, as discussed above. For example, due to a firmware change in a hardware entity the server comprising this hardware may report its model number or interface card in a slightly different format than what was previously recited. This results in the heuristics rules used by the conventional network management systems to generate a different identifier for this hardware than what was previously assigned thereto. Therefore, because different identifiers are used for the same entity, these conventional systems believe that an entity has been removed and a new entity has been added to the system/ network.

The magnitude of this problem is significant since large systems management tools, for example those in the area of network management, may keep data on 100K-1M entities. Additionally, two different system management software may report identifier in two different formats (dotted versus un-dotted notation for IP addresses, for example), and when the information is federated, a format convert needs to be put in place. This format conversion may break down when new devices appear or when either of the software management system changes its style of reporting.

Therefore, various embodiments of the present invention overcome these problems by not only analyzing the entities themselves, but also their underlying behavior within the system/network. As will be discussed in greater detail below, the network manager 108 uses "network-similarity" measures to deduce that an entity is a duplicate of another entity already existing in the system 102. The network manager 108 takes advantage of the fact that in an IT system/network 102 entities are not stand-alone, but are in relationship with other entities (e.g., a database application can be serving data to an application, a server can be on the same VLAN as another server, a storage device can be directly attached to a server, etc.). This can be thought of as creating a network where the nodes of the network are IT system entities and links between the nodes denote relationships between the entities.

Such a "network-graph" can be readily prepared before and after migration using various discovery tools. A network entity is similar to another network entity (possibly in a different network) if a local neighborhood (e.g., a two hop neighborhood) of the entities are similar. The details of which relationships to include in the consideration and what characteristics of the local neighborhood to factor while computing similarity depends on the particular application at hand. Using network similarity measures allows system administrators and systems management software to avoid relying exclusively on heuristic rules. This provides for more robust, accurate, and universal reconciliation of IT system/network management data.

In one embodiment, the network manager 108 generates a plurality of snapshots, e.g., network graphs (also referred to as "topology models") 124, of the IT system/network 102 topology. These network graphs 124 are generated by the network manager 108 via discovery tools before and after the IT system/network undergoes changes. For example, the network manager 108 comprises a network discovery module 112. The network discovery module 110, in one embodiment, can collect raw IP data to detect the existence of an entity 104 on the network 102, and can also query the entity for further inventory and connectivity information. This information collected by the network discovery module 110 is stored as network management data 122. The network discovery module 110 uses the network management data 122 to generate a network graph 124 that can be visualized by network operators as topology maps via a user interface (not shown). Such topology maps can be customized to show specific devices or specific device groupings, such as subnets and VLANs.

Figure 2:
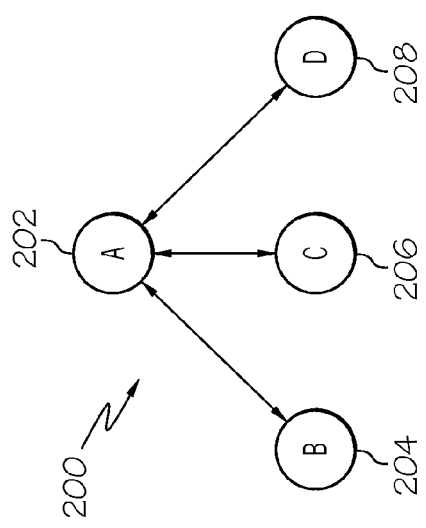
FIGS. 2-3 show examples of network graphs comprising managed network entities according to one embodiment of the present invention.
Figure 3:
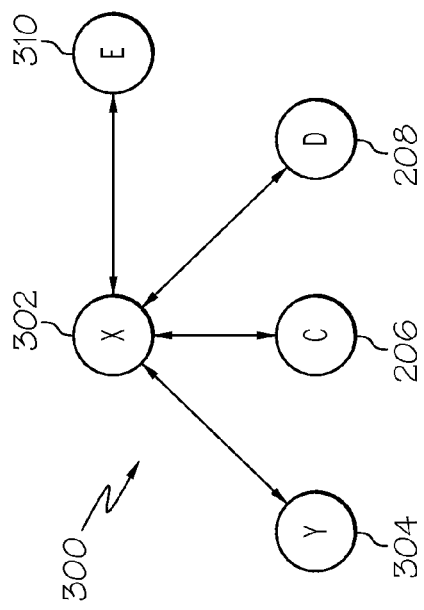

FIGS. 2 and 3 shows various examples of network graphs 200, 300 generated by the network discovery module 108 at different points in time where managed entities within the system/network 102 are mapped to vertices and relations between managed elements are mapped to edges. For example, FIG. 2 shows a network graph 200 created by the network discovery module 108 before a change occurs in the IT system/network 102 and FIG. 3 shows a network graph 300 created by the network discovery module 108 after a change occurs in the IT system/network 102. In particular, the graph 200 of FIG. 2 shows that the IT system/network 102 comprises a plurality of managed entities such as Entity_A 202, Entity_B 204, Entity_C 206, and Entity_D 208. However, the graph 300 of FIG. 3 shows Entity_X 302 instead of Entity_A 202, Entity_Y 304 instead of Entity_B 204, and shows a new entity, Entity_E 310 as a result of a change having occurred in the IT system/network 102 such as, but not limited to, an entity being moved to a new location and/or a new entity being added.

As discussed above, many conventional network management systems assign different identifiers to the same entity as a result of a change to the entity such as a firmware change or a location change. Therefore, given the two graphs 200, 300 in FIGS. 2 and 3, conventional network management systems would generally indicate that Entity_A 202 and Entity_B 204 have been removed from the system 102 and that Entity_E 310, Entity_X 302, and Entity_Y 304 have been added based on the identifiers in graph 300 being different than the identifiers in graph 200. This is an incorrect determination since Entity_A 202/Entity_X 310 are the same entity and Entity_B 204/Entity_Y 304 are the same entity in the example of FIGS. 2 and 3.

However, various embodiments of the present invention are able to correctly reconcile these graphs 200, 300 even though the identifiers of identical entities are different. For example, various embodiments correctly identify that these two entities 202, 302 are the same entity as follows. The network manager 108, via the entity matching module 112, analyzes each of the graphs 200, 300 and identifies entities with identical, i.e., unchanged, identifiers. For example, the network manager 108 determines that Entity_C 206 and Entity_D 208 in the first graph 200 each have the same identifier in the second graph 300. Therefore, the network manager 108 marks these entities 206, 208 as "pinned" during the reconciliation process. A "pinned" status indicates that the given entity does not require any further reconciliation. It should be noted that a human user can also manually select which entities to "pin" via a user interface (not shown). The user's selections are then received by the network manager 108.

It should be noted that the network manager 108 does not need to consider entity identifier information. For example, the network manager 108, in this embodiment, only uses the identifiers to identify a set of entities to ignore during the reconciliation process and uses network similarity measures to perform the reconciliation process. If the network manager 108 does not consider entity identifier information the network manager 108 performs the reconciliation process on all of the entities in the graphs 200, 300.

The network manager 108, via the entity matching module 112, then annotates nodes and edges in the graphs 200, 300 associated with the un-pinned entities with a rich set of attributes. For example, a node can be annotated with attributes such as, but not limited to, CPU speed, the number of interface cards associated with the entity, model name of the entity, and the like. Edges can be annotated with attributes such as, but not limited to, ISO layer 2/3 link information, BGP peers, VPN tunnel end points, and the like.

The network manager 108, via the entity matching module 112 then performs a mapping operation on each of the un-pinned entities, which in the example of FIGS. 2-3 are Entity_A 202, Entity_B 202, Entity_X 302, and Entity_E 310. The mapping operation maps each un-pinned entity in the first graph 200 to zero or more un-pinned entities in the second graph 300. Each mapping is assigned a similarity strength score using a network similarity measure. Various similarity measures can be used such as, but not limited to, traditional graph similarity measures for graph isomorphism such as maximum weighted matching score (arbitrary graphs), edit distance score (protein networks), geometric hash distance score (Cartesian networks), and the like.

In one example, the similarity strength score is based on the entity attributes corresponding the annotated nodes and edges discussed above. Such rich node and edge attributes have prompted node-similarity and edge-similarity metrics, e.g., based on vector cosine distance between these multidimensional node and edge attributes. Recently, network-centric similarity measures such as set resemblance of neighbor tuples, average random walk hitting times to "pinned" entities have been proposed. See, for example, G. Jeh and J. Widom, "SimRank: a measure of structural-context similarity", In Proc. 2002 ACM SIGKDD Int. Conf. on Knowledge Discovery and Data Mining (KDD '02), pages 538-543, Edmonton, Canada, July 2002 and X. Yan, P. S. Yu, and J. Han, "Substructure similarity search in graph databases", In Proc. 2005 ACM-SIGMOD Int. Conf. Management of Data (SIGMOD '05), pages 766-777, Baltimore, Md., June 2005, which are hereby incorporated by reference in their entireties.

Figure 4:
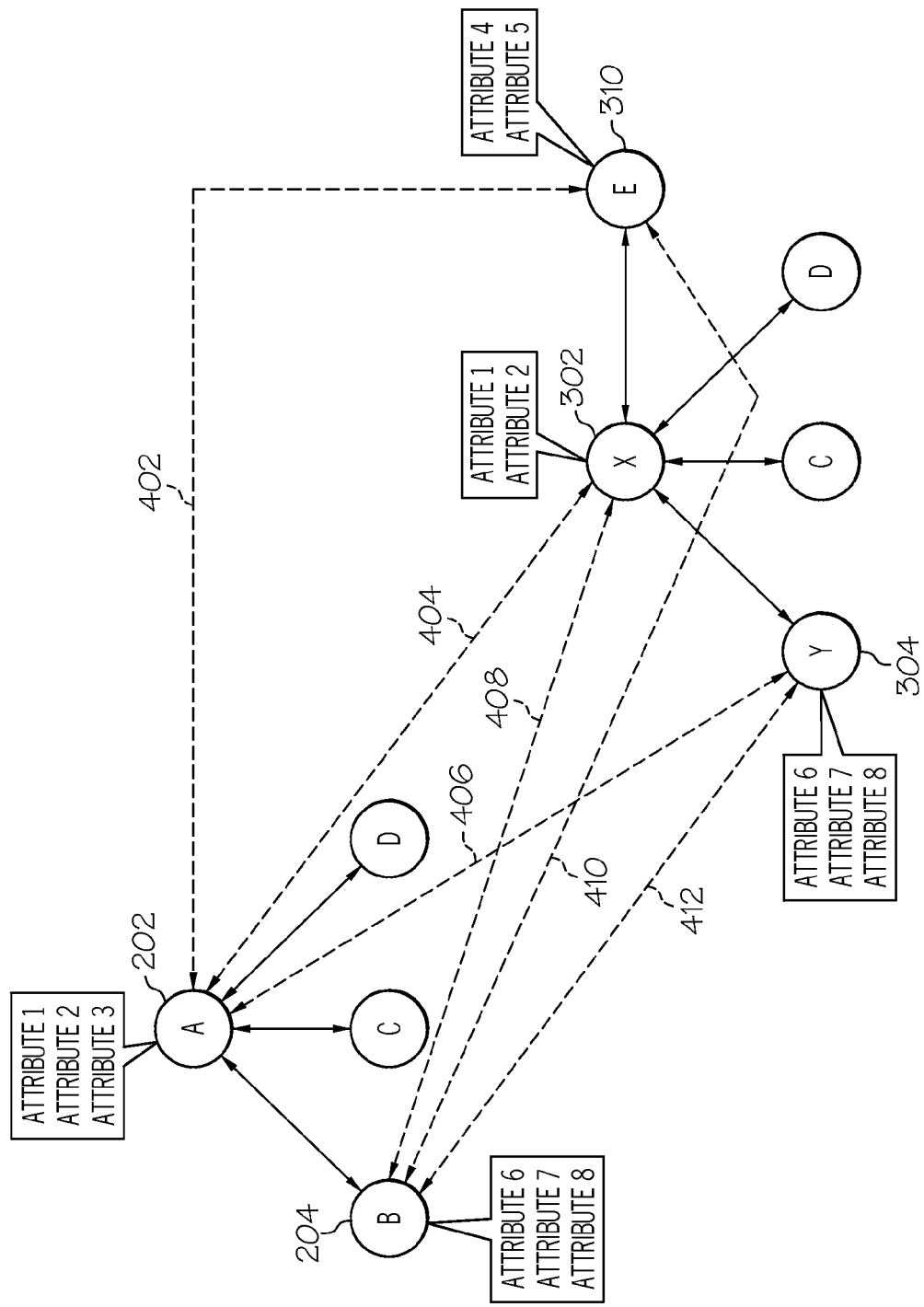
FIG. 4 shows an example of managed entities in the graphs of FIGS. 2-3 being mapped to each other according to one embodiment of the present invention.

FIG. 4 shows that the un-pinned entities 202, 204 302, 304 310 have been mapped to each other as denoted by the dashed lines 402, 404, 406, 408, 410, 412. As discussed above, each of these mappings is assigned a similarity strength score based on the attributes associated with the un-pinned entities. For example, the mappings 402, 406, 408, 410 between Entity_A/Entity_E, Entity_A/Entity_Y, Entity_B/Entity_X, and Entity_B/Entity_E will have a lower similarity score since the similarity between the attributes (as annotated at the nodes and edges) of these respective entities is low, as shown in FIG. 4. However, the similarity scores of the mappings 404 and 412 between Entity_A/Entity_X and Entity_B/Entity_Y is high since the similarity between the attributes (as annotated at the nodes and edges) of these respective entities is high, as shown in FIG. 4.

It should be noted that various mechanisms can be used to assign similarity scores in the graphs 200, 300 (and sub-graphs 500). For example, structural similarity (See G. Jeh and J. Widom) can be used as a coarse grained measure of similarity between entities in two large graphs. Also, more fine-grained measures of similarity can be used when graphs are smaller (such smaller (sub)-graphs are obtained by partitioning the larger graph). For example, T. Wang, M. Srivatsa, D. Agrawal and L. Liu, "Learning, Indexing and Diagnosing Network Faults", 15$^{th}$ ACM SIGKDD Conference on Knowledge Discovery and Data Mining (KDD), July 2009, which is hereby incorporated by reference in its entirety, proposes fine grained topological signatures for localizing (pin-pointing) network faults.

Based on these similarity strength scores the network manager 108, via the sub-graph partitioning module 116, creates sub-graph partitions 126 of the graphs 200, 300 to improve scalability. For example, the graphs 200, 300 are partitioned such that the entities within the sub-graph have similarity strength scores above a given threshold. Stated differently, the network manager 108 further partitions the graphs 200, 300 so that a set of sub-graph pairs (e.g., (SN1(1), SN2(1)), (SN1(2), SN2(2)), . . . , (SN1(i), SN2(i)), . . . , (SN1(k), SN2(k))) can be extracted from the graphs 200, 300 where the mapping between sub-graphs in a pair has a similarity score above a given threshold (the score of a mapping being calculated using similarity strength scores of the mappings 402, 404, 406, 408, 410, 412 between the entities in the sub-graph).

Figure 5:
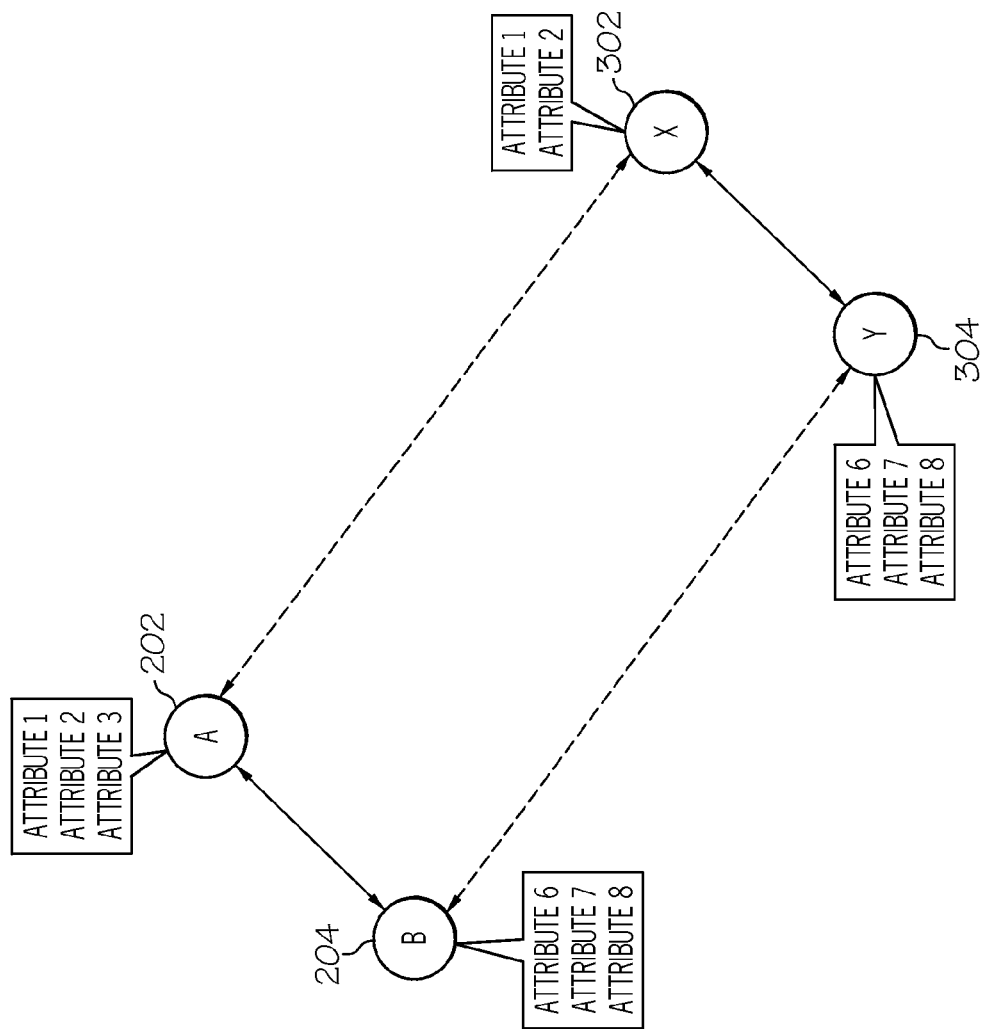
FIG. 5 shows one example of a sub-graph resulting from partitioning the graphs of FIGS. 2-3 according to one embodiment of the present.

For example, FIG. 5 shows one example of a sub-graph 500 resulting from the above partitioning operation. In the example of FIG. 5, only the sub-graph comprising Entity_A 202, Entity_X 302, Entity_B 204, and Entity_Y 304 has been selected. This is because in the example of FIG. 5 only these entities 202, 302, 204, 304 are associated with at least one mapping 402, 412 that was determined to have a similarity score above the given threshold. As a result, the network manager 108 determines that Entity_E 310 is a new entity since this entity cannot be matched to another entity within the first network graph 200. The network manager 108 then notifies a user or other network management software of this determination for further processing.

The network manager 108, via the sub-graph matching module 116, performs an inexact matching process on each sub-graph pair, e.g., Entity_A/Entity_X, Entity_A/Entity_Y, and Entity_B/Entity_Y. The inexact matching process performs low-level and detailed mapping between nodes and edges in the extracted sub-graph pairs. One example of an inexact graph matching process is as follows. Let each entity in a sub-graph, e.g., Entity_A 202, Entity_X 302, Entity_B 204, and Entity_Y 304, as represented by a vertex/node have a set of attributes (such as device class, system location, etc.) and each edge, which denotes the relationship between two entities, have also have a set of attributes. The network manager 108 then performs inexact matching between sub-graph pairs based on these attributes. Then, based on the matching between attributes of entities and edges of the sub-graph pairs (SN1(k), SN2(k)), a similarity score is assigned thereto and an aggregated score is obtained for the entire mapping function. The mapping function that maximizes the aggregated similarity score is selected using standard optimization techniques.

The network manager 108, via the entity comparing module 118, the compares the similarity score of each mapping resulting from the inexact matching process to another threshold to identify entities that have a high similarity score. These network manager identifies the entities associated with a similarity score above the given threshold as identical entities, i.e., entities that are the same within both graphs 200, 300. The network manager 108 then notifies a user via a user interface (not shown) or other network management software of this determination for further processing. For example, in the example of FIG. 5, the network manager 108 identifies Entity_A/Entity_X as being the same and Entity_B/Entity_Y as being the same since their attributes have a similarity score above the given threshold. The network manager 108 also identifies Entity_A 202 as being different than Entity_Y 304 since their attributes have a similarity score below the given threshold. This information is then relayed to a user or other network management software of this determination for further processing.

Operational Flow Diagrams

Figure 6:
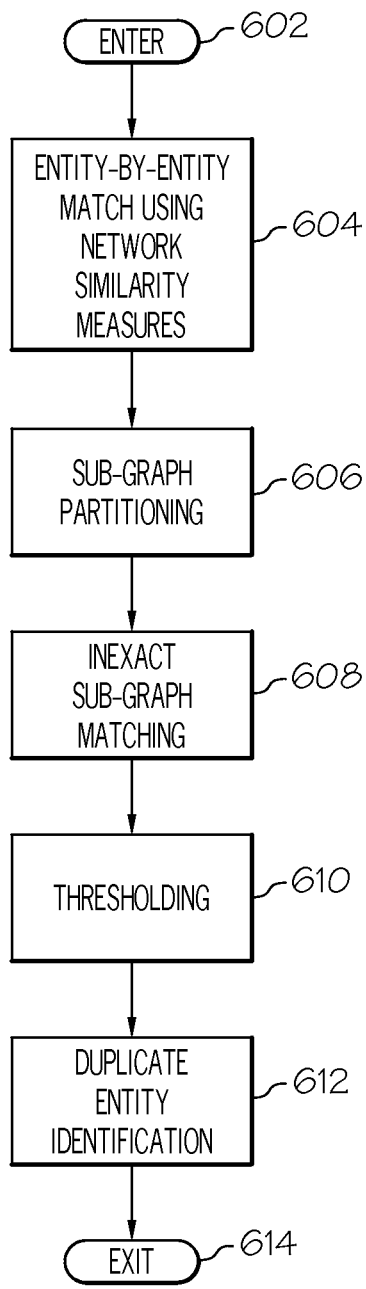
FIGS. 6-7 are operational flow diagrams illustrating various examples of managing network management data according to one embodiment of the present invention.
Figure 7:
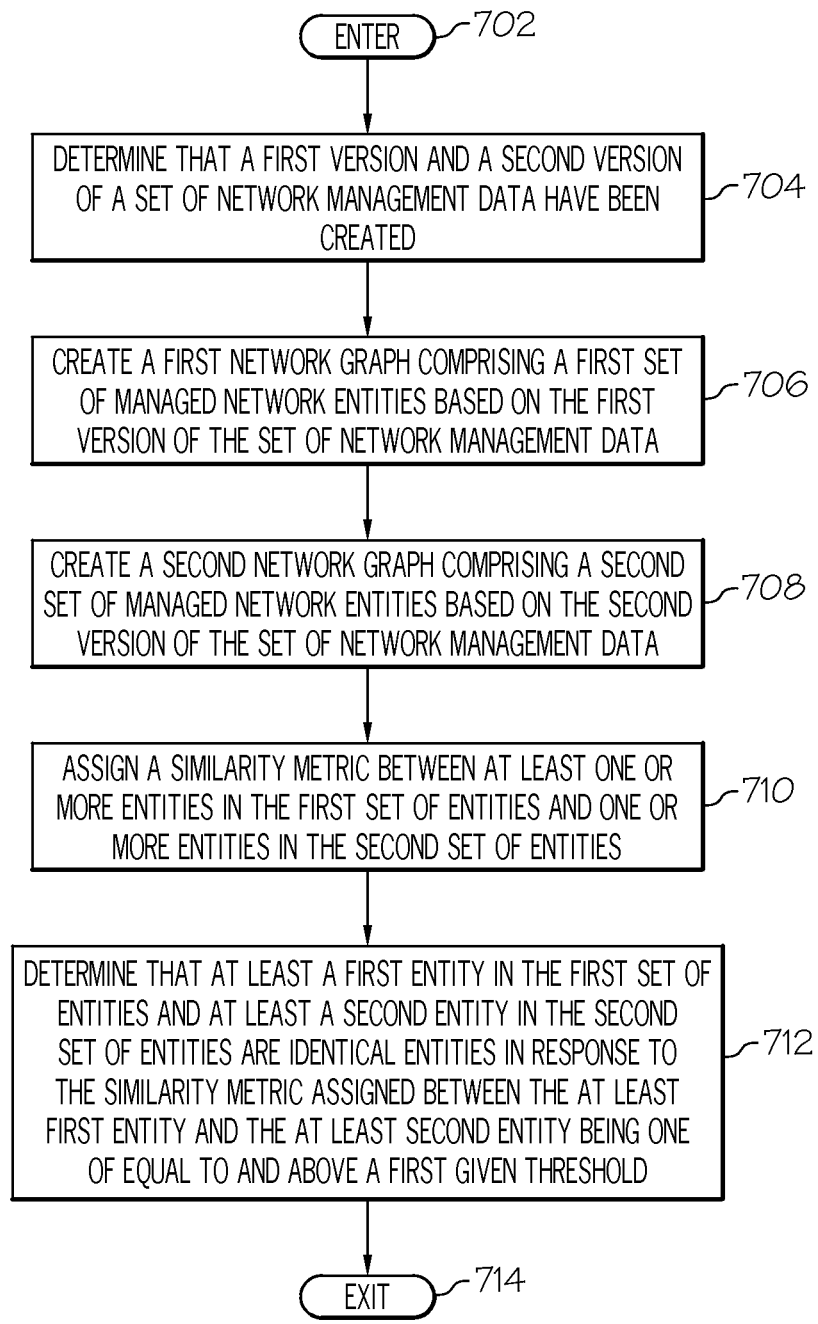

Referring now to FIGS. 6-7, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 is an operational flow diagram illustrating one example of managing network management data. The operational flow diagram of FIG. 6 begins at step 602 and flows directly to step 604. The network manager, at step 604, performs entity-by-entity matching using network similarity measures, as discussed above. For example, the network manager 108 analyzes two network graph snapshots, N1 and N2. The network manager 108 pins down all entities that have unchanged identifiers in the two snapshots. The network manager also maps each remaining entity in N1 to an entity in N2 with a similarity score (similarity score computed based on several entity attributes).

The network manager 108, at step 606, performs sub-graph partitioning, as discussed above. For example, to improve scalability, the network manager 108 creates sub-network partitions of the snapshots such that the entities within the sub-network have high similarity scores. The network manager 108 then calculates a sub-network score based on entity mapping scores. The network manager 108, at step 608, then performs in-exact sub-graph matching, as discussed above. For example, the network manager 108 performs a detailed mapping of node entities and edges and utilizes in-exact graph matching algorithms. The network manager 108, at step 610, compares similarities scores within the sub-network to one or more thresholds to identify, with high confidence, similar entities that were mapped together by the above processes. The network manager 108, at step 612, identifies these similar entities as identical entities and notifies a user such as an administrator via a graphical user interface of the identical entities in the first snapshot and the second snapshot. The control flow then exits at step 614.

FIG. 7 is an operational flow diagram illustrating another example of managing network management data. The operational flow diagram of FIG. 7 begins at step 702 and flows directly to step 704. The network manager 108, at step 704, determines that a first version and a second version of a set of network management data have been created. The set of network management data is associated with a plurality of managed entities in a network. The network manager 108, at step 706, creates, in response to the determination, a first network graph based on the first version of the set of network management data. The first network graph comprises a first set of entities in the plurality of entities.

The network manager 108, at step 708, creates, in response to the determination, a second network graph based on the second version of the set of network management data. The second network graph comprises a second set of entities in the plurality of entities. The network manager 108, at step 710, assigns a similarity metric between at least one or more entities in the first set of entities and one or more entities in the second set of entities. The network manager 108, at step 712, determines that at least a first entity in the first set of entities and at least a second entity in the second set of entities are identical entities in response to the similarity metric assigned between the at least first entity and the at least second entity being one of equal to and above a first given threshold. The control flow then exits at step 714.

Information Processing System

Figure 8:
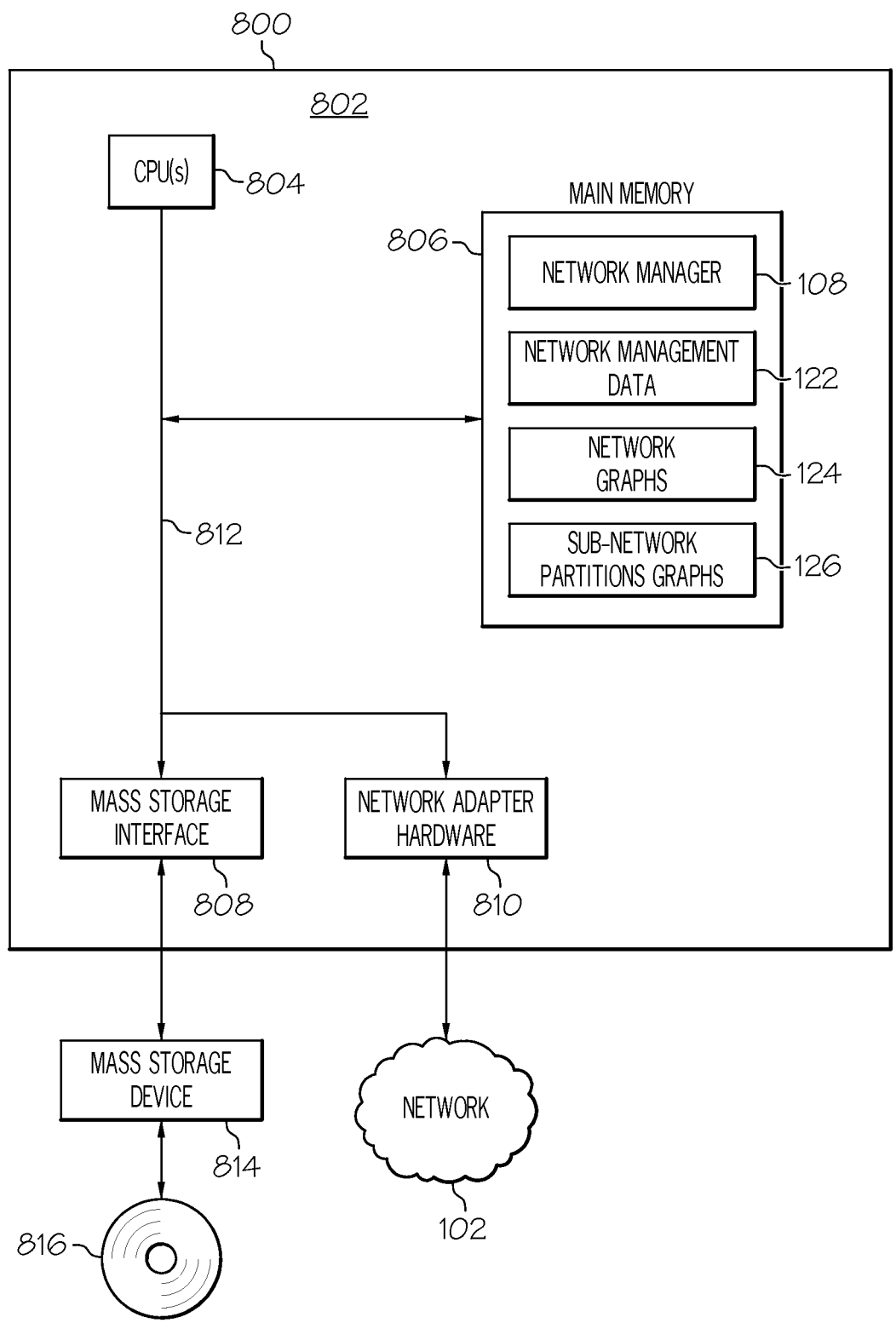
FIG. 8 is a block diagram illustrating a detailed view of an information processing system according to one embodiment of the present invention.

FIG. 8 is a block diagram illustrating a more detailed view of an information processing system 800, such as the server 102, that can be utilized in the operating environment 100 discussed above with respect to FIG. 1. The information processing system 800 is based upon a suitably configured processing system adapted to implement one or more embodiments of the present invention. Similarly, any suitably configured processing system can be used as the information processing system 800 by embodiments of the present invention.

The information processing system 800 includes a computer 802. The computer 802 has a processor(s) 804 that is connected to a main memory 806, mass storage interface 808, and network adapter hardware 810. A system bus 812 interconnects these system components. The main memory 806, in one embodiment, comprises the network manager 108, its components, the network management data 122, the network graphs 124, and the sub-graph partitions 126 discussed above.

Although illustrated as concurrently resident in the main memory 806, it is clear that respective components of the main memory 806 are not required to be completely resident in the main memory 806 at all times or even at the same time. In one embodiment, the information processing system 800 utilizes conventional virtual addressing mechanisms to allow programs to behave as if they have access to a large, single storage entity, referred to herein as a computer system memory, instead of access to multiple, smaller storage entities such as the main memory 806 and data storage device 816. Note that the term "computer system memory" is used herein to generically refer to the entire virtual memory of the information processing system 800.

The mass storage interface 808 is used to connect mass storage devices, such as mass storage device 814, to the information processing system 800. One specific type of data storage device is an optical drive such as a CD/DVD drive, which may be used to store data to and read data from a computer readable medium or storage product such as (but not limited to) a CD/DVD 816. Another type of data storage device is a data storage device configured to support, for example, NTFS type file system operations.

Although only one CPU 804 is illustrated for computer 802, computer systems with multiple CPUs can be used equally effectively. Embodiments of the present invention further incorporate interfaces that each includes separate, fully programmed microprocessors that are used to off-load processing from the CPU 804. An operating system (not shown) included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 800. The network adapter hardware 810 is used to provide an interface to a network 102. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 816, CD ROM, or other form of recordable media, or via any type of electronic transmission mechanism.

NON-LIMITING EXAMPLES

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. Various embodiments were chosen and described in order to best explain the principles of the invention and the practical application, and to enable others of ordinary skill in the art to understand the invention for various embodiments with various modifications as are suited to the particular use contemplated.

What is claimed is:

1. A method for managing network management data, the method comprising:
   determining that a first version of a set of network management data and a second version of the set of network management data have been created, the first and second versions of the set of network management data each being associated with a plurality of managed entities in a network and comprising at least an identifier of each of the plurality of managed entities;
   determining that the identifier of at least one of the plurality of managed entities in the first version of the set of network management data fails to match any of the identifiers in the second version of the set of network management data;
   creating, based on the determining the identifier of at least one of the plurality of managed entities in the first version of the set of network management data fails to match any of the identifiers in the second version of the set of network management data, a first network graph based on the first version of the set of network management data, the first network graph comprising a first set of entities in the plurality of managed entities;
   creating, based on the determining the identifier of at least one of the plurality of managed entities in the first version of the set of network management data fails to match any of the identifiers in the second version of the set of network management data, a second network graph based on the second version of the set of network management data, the second network graph comprising a second set of entities in the plurality of managed entities;
   assigning a similarity metric between at least one or more entities in the first set of entities and one or more entities in the second set of entities; and
   determining that at least a first entity in the first set of entities and at least a second entity in the second set of entities are identical entities based on the similarity metric assigned between the first entity and the second entity being one of equal to and above a first given threshold.

2. The method of claim 1, further comprising:
   comparing the identifier for each entity in the first set of entities to an identifier for each entity in the second set of entities; and
   identifying, based on the comparing, at least one pair of entities from the first set of entities and the second set of entities that comprise an identical identifier; and
   marking the at least one pair of entities as being identical.

3. The method of claim 1, wherein the first network graph comprises:
   a first set of vertices representing the first set of entities; and
   a first set of edges representing a first set of relationships between the first set of entities,
   wherein the second network graph comprises:
   a second set of vertices representing the second set of entities; and
   a second set of edges representing a second set of relationships between the second set of entities.

4. The method of claim 3, further comprising:
   annotating each vertex in the first set of vertices with a first set of attributes associated with an entity in the first set of entities;
   annotating each edge in the first set of edges with a second set of attributes associated with a relationship in the first set of relationships;
   annotating each vertex in the second set of vertices with a third set of attributes associated with an entity in the second set of entities; and
   annotating each edge in the second set of edges with a fourth set of attributes associated with a relationship in the second set of relationships.

5. The method of claim 4, wherein the similarity metric is based on the first set of attributes, the second set of attributes, the third set of attributes, and the fourth set of attributes.

6. The method of claim 1, wherein the similarity metric is assigned based on a network similarity measure comprising one of:
   a graph isomorphism measure;
   an edit distance score measure;

a geometric hash distance score measure;
a vector cosine distance measure; and
a network-centric similarity measure.

7. The method of claim 1, further comprising:
determining, after assigning the similarity metric, that the similarity metric assigned between at least the first entity and the second entity is one of equal to and above a second given threshold; and
partitioning the first network graph and the second network graph into a first sub-graph and a second sub-graph, respectively, comprising only at least the first entity and the second entity based on determining that the similarity metric assigned between at least the first entity and the second entity is one of equal to and above the second given threshold,
wherein determining that at least the first entity in the first set of entities and at least the second entity in the second set of entities are identical entities is based on the first sub-graph and the second sub-graph.

8. A system for managing network management data, the system comprising:
a memory;
a processor communicatively coupled to the memory; and
a network manager communicatively coupled to the memory and the processor, the network manager is configured for performing a method comprising:
determining that a first version of a set of network management data and a second version of the set of network management data have been created, the first and second versions of the set of network management data each being associated with a plurality of managed entities in a network and comprising at least an identifier of each of the plurality of managed entities;
determining that the identifier of at least one of the plurality of managed entities in the first version of the set of network management data fails to match any of the identifiers in the second version of the set of network management data;
creating, based on the determining the identifier of at least one of the plurality of managed entities in the first version of the set of network management data fails to match any of the identifiers in the second version of the set of network management data, a first network graph based on the first version of the set of network management data, the first network graph comprising a first set of entities in the plurality of managed entities;
creating, based on the determining the identifier of at least one of the plurality of managed entities in the first version of the set of network management data fails to match any of the identifiers in the second version of the set of network management data, a second network graph based on the second version of the set of network management data, the second network graph comprising a second set of entities in the plurality of managed entities;
assigning a similarity metric between at least one or more entities in the first set of entities and one or more entities in the second set of entities; and
determining that at least a first entity in the first set of entities and at least a second entity in the second set of entities are identical entities based on the similarity metric assigned between the first entity and the second entity being one of equal to and above a first given threshold.

9. The system of claim 8, the network manager being further configured for performing the method comprising:
comparing the identifier for each entity in the first set of entities to an identifier for each entity in the second set of entities; and
identifying, based on the comparing, at least one pair of entities from the first set of entities and the second set of entities that comprise an identical identifier; and
marking the at least one pair of entities as being identical.

10. The system of claim 8, wherein the first network graph comprises:
a first set of vertices representing the first set of entities; and
a first set of edges representing a first set of relationships between the first set of entities,
wherein the second network graph comprises:
a second set of vertices representing the second set of entities; and
a second set of edges representing a second set of relationships between the second set of entities.

11. The system of claim 10, the network manager being further configured for performing the method comprising:
annotating each vertex in the first set of vertices with a first set of attributes associated with an entity in the first set of entities;
annotating each edge in the first set of edges with a second set of attributes associated with a relationship in the first set of relationships;
annotating each vertex in the second set of vertices with a third set of attributes associated with an entity in the second set of entities; and
annotating each edge in the second set of edges with a fourth set of attributes associated with a relationship in the second set of relationships.

12. The system of claim 11, wherein the similarity metric is based on the first set of attributes, the second set of attributes, the third set of attributes, and the fourth set of attributes.

13. The system of claim 8, wherein the similarity metric is assigned based on a network similarity measure comprising one of:
a graph isomorphism measure;
an edit distance score measure;
a geometric hash distance score measure;
a vector cosine distance measure; and
a network-centric similarity measure.

14. The system of claim 8, the network manager being further configured for performing the method comprising:
determining, after assigning the similarity metric, that the similarity metric assigned between at least the first entity and the second entity is one of equal to and above a second given threshold; and
partitioning the first network graph and the second network graph into a first sub-graph and a second sub-graph, respectively, comprising only at least the first entity and the second entity based on determining that the similarity metric assigned between at least the first entity and the second entity is one of equal to and above the second given threshold,
wherein determining that at least the first entity in the first set of entities and at least the second entity in the second set of entities are identical entities is based on the first sub-graph and the second sub-graph.

15. A computer program product managing network management data, the computer program product comprising:
a non-transitory storage medium readable by a processing circuit and storing instructions for execution by the processing circuit for performing a method comprising:

determining that a first version of a set of network management data and a second version of the set of network management data have been created, the first and second versions of the set of network management data each being associated with a plurality of managed entities in a network and comprising at least an identifier of each of the plurality of managed entities;

creating, based on the determining the identifier of at least one of the plurality of managed entities in the first version of the set of network management data fails to match any of the identifiers in the second version of the set of network management data, a first network graph based on the first version of the set of network management data, the first network graph comprising a first set of entities in the plurality of managed entities;

creating, based on the determining the identifier of at least one of the plurality of managed entities in the first version of the set of network management data fails to match any of the identifiers in the second version of the set of network management data, a second network graph based on the second version of the set of network management data, the second network graph comprising a second set of entities in the plurality of managed entities;

assigning a similarity metric between at least one or more entities in the first set of entities and one or more entities in the second set of entities; and determining that at least a first entity in the first set of entities and at least a second entity in the second set of entities are identical entities based on the similarity metric assigned between the first entity and the second entity being one of equal to and above a first given threshold.

16. The computer program product of claim 15, the method further comprising:

comparing the identifier for each entity in the first set of entities to an identifier for each entity in the second set of entities; and identifying, in response to the comparing, at least one pair of entities from the first set of entities and the second set of entities that comprise an identical identifier; and marking the at least one pair of entities as being identical.

17. The computer program product of claim 15, wherein the first network graph comprises:

a first set of vertices representing the first set of entities; and a first set of edges representing a first set of relationships between the first set of entities, wherein the second network graph comprises:

a second set of vertices representing the second set of entities; and a second set of edges representing a second set of relationships between the second set of entities.

18. The computer program product of claim 17, the method further comprising:

annotating each vertex in the first set of vertices with a first set of attributes associated with an entity in the first set of entities;

annotating each edge in the first set of edges with a second set of attributes associated with a relationship in the first set of relationships;

annotating each vertex in the second set of vertices with a third set of attributes associated with an entity in the second set of entities; and annotating each edge in the second set of edges with a fourth set of attributes associated with a relationship in the second set of relationships.

19. The computer program product of claim 18, wherein the similarity metric is based on the first set of attributes, the second set of attributes, the third set of attributes, and the fourth set of attributes.

20. The computer program product of claim 15, wherein the similarity metric is assigned based on a network similarity measure comprising one of:

a graph isomorphism measure;

an edit distance score measure;

a geometric hash distance score measure;

a vector cosine distance measure; and a network-centric similarity measure.

21. The computer program product of claim 15, the method further comprising:

determining, after assigning the similarity metric, that the similarity metric assigned between at least the first entity and the second entity is one of equal to and above a second given threshold; and partitioning the first network graph and the second network graph into a first sub-graph and a second sub-graph, respectively, comprising only at least the first entity and the second entity based on determining that the similarity metric assigned between at least the first entity and the second entity is one of equal to and above the second given threshold, wherein determining that at least the first entity in the first set of entities and at least the second entity in the second set of entities are identical entities is based on the first sub-graph and the second sub-graph.

* * * * *